(No Model.)
J. DREISER.
FISHING REEL.
No. 283,084. Patented Aug. 14, 1883.
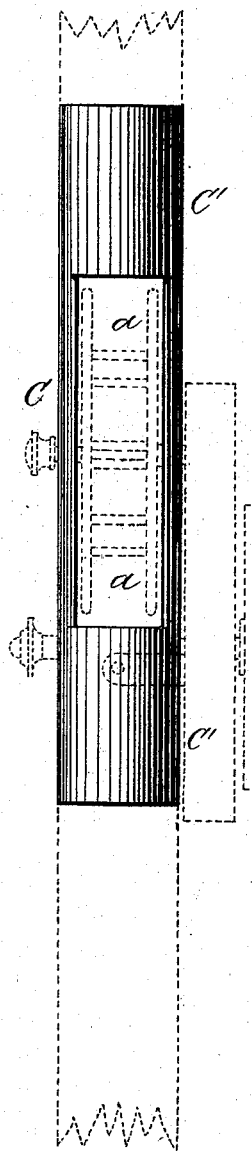
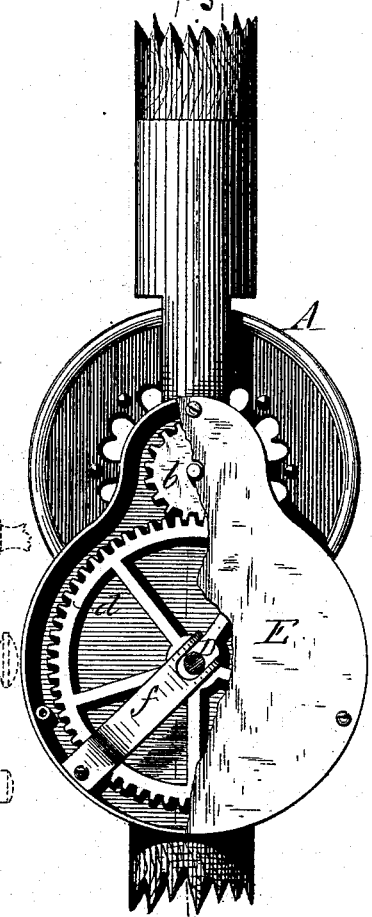
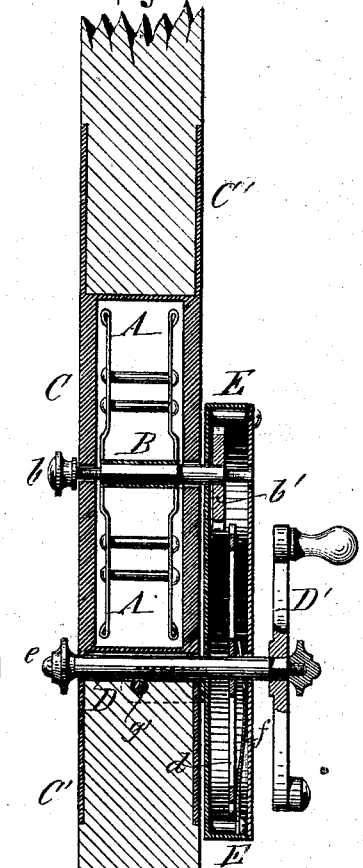
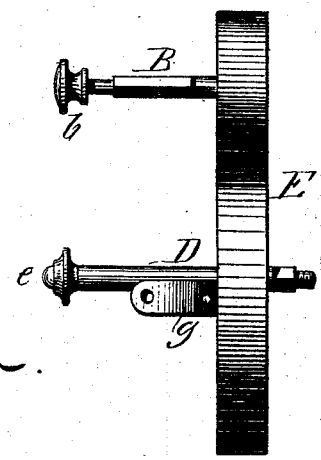
WITNESSES:
Jol. N. Rosenbaum.
Otto Risch.
INVENTOR
John Dreiser
BY Paul Goepel.
ATTORNEY

UNITED STATES PATENT OFFICE.

JOHN DREISER, OF NEW YORK, N. Y.

FISHING-REEL.

SPECIFICATION forming part of Letters Patent No. 283,084, dated August 14, 1883.

Application filed April 30, 1883. (No model.)

*To all whom it may concern:*

Be it known that I, JOHN DREISER, of the city, county, and State of New York, have invented certain new and useful Improvements in Fishing-Reels, of which the following is a specification.

This invention has reference to an improved fishing-reel of that class in which the reel follows the tension of the line when the latter is thrown out, but on which the reel can be revolved very quickly when the line is to be wound up.

The invention consists of certain details of construction, as will appear hereinafter.

In the accompanying drawings, Figure 1 represents a side elevation of my improved fishing-reel, with a part broken away. Fig. 2 is a vertical transverse section on line $xx$, Fig. 1; and Figs. 3 and 4 are, respectively, a side view of the supporting-stock of the reel and an end view of the box containing the winding-up mechanism of the same, showing its mode of attachment to the rod.

Similar letters of reference indicate corresponding parts.

A in the drawings represents the reel, and B the spindle of the same, which is made square at its middle portion, so as to apply the reel rigidly thereto, and round at the points where it is journaled to a metallic stock, C, which forms a part of the fishing-rod.

The stock C is provided with sockets C' at both ends, to which sockets the upper and lower sections of the fishing-rod are securely applied. The stock C is provided with an oblong recess or open part, $a$, intermediately between the end sockets, C', within which the reel A is supported, so that it projects at both sides of the fishing-rod, its spindle being in line with a vertical center plane passing transversely through the longitudinal axis of the rod.

The reel-spindle B is provided at one side with a screw-button, $b$, and at the other side with a pinion, $b'$, which meshes with a gear-wheel, $d$, that is keyed to a shaft, D, to the outer end of which the crank-handle D' is keyed. The crank-shaft D passes through the openings of the lower socket, C', of the stock C, and is loosely supported thereby, so as to be capable of laterally-shifting motion between the terminal button $e$, at the opposite end of the shaft D, and the crank-handle D'.

The pinion $b'$ and the gear-wheel $d$ are inclosed by a casing, E, that corresponds in general shape to the same. The gear-wheel $d$ and the shaft D are acted upon by a strong band-spring, $f$, which is attached at its outer end to the casing E and forked at its inner end, so as to bear upon the gear-wheel $d$. The spring $f$ tends to throw the gear-wheel $d$ into mesh with the reel-pinion $b'$, so as to cause the rapid winding up of the line on the reel A when the shaft D is turned by its crank D'. By shifting the shaft D and its gear-wheel $d$ laterally against the tension of the spring $f$ the gear-wheel $d$ is thrown out of gear with the pinion $b'$, so that the reel A can then turn independently of the winding-up mechanism whenever it is desired to throw out the line.

The casing E is further provided with a semicircular portion, $g$, that is secured by a transverse pin or key, $g'$, to the lower socket, C', of the stock C, by means of which the casing E is rigidly attached to the stock C without exerting any strain upon the reel-spindle B and shaft D.

When it is desired to separate the parts of the fishing-rod after use, so as to bring them into a smaller compass, the casing E is detached from the stock C by unscrewing the screw-buttons $b$ and $e$ and releasing the pin $g'$. The reel is then taken out of the recess $a$ of the stock and the rod-sections removed from the sockets of the stock, so that the parts can be conveniently packed.

The reel is supported by my arrangement, not at one side of the fishing-rod, but in line with the axis of the same, the actuating mechanisms being close to the rod at one side of the same, so that it can not only be handled with great convenience, but can also be made less expensive in construction without the small parts that make the fishing-reels heretofore in use so expensive.

Having thus described my invention, I claim as new and desire to secure by Letters Patent—

1. The combination of a supporting-stock having end sockets for the pole-section and a central recess, a reel-spindle passing through said recess, and provided with a button at one end and a pinion at the other, a reel fixed to said spindle within said recess, a crank-shaft passing through one of the sockets of said stock, and provided with a button at one end and a crank at the opposite end, and a gear-wheel fixed to said crank-shaft, the latter being adapted to slide in its bearings to bring the gear-wheel into or out of gear with the pinion aforesaid, the said parts being readily detachable for packing the pole, substantially as described.

2. The combination of a metallic stock, C, having sockets C' for the rod-sections, a reel, A, supported in a recess of the stock, a reel-spindle, B, having pinion $b'$, a crank-shaft, D, supported loosely in one of the sockets, a gear-wheel, $d$, keyed to the crank-shaft D, and a spring, $f$, pressing upon said gear-wheel $d$, so as to throw it into or out of mesh with the pinion $b'$ by the laterally-shifting motion of the crank-shaft D, substantially as and for the purpose set forth.

3. The combination of a recessed supporting-stock, C, forming part of the fishing-rod, a reel, A, a reel-spindle, B, supported in bearings of the stock C, pinion $b'$, gear-wheel $d$, crank-shaft D D', spring $f$, and casing E, provided with means to attach it to the stock C, substantially as set forth.

In testimony that I claim the foregoing as my invention I have signed my name in presence of two subscribing witnesses.

JOHN DREISER.

Witnesses:
OTTO RISCH,
SIDNEY MANN.